US 7,652,576 B1

(12) United States Patent
Crossno et al.

(10) Patent No.: US 7,652,576 B1
(45) Date of Patent: Jan. 26, 2010

(54) METHOD AND APPARATUS FOR LOCATING AND/OR OTHERWISE MONITORING AN ID TAGGED ASSET'S CONDITION

(75) Inventors: John M. Crossno, Irving, TX (US); Adam Crossno, Flower Mound, TX (US); Bruce C. Lutz, Richardson, TX (US)

(73) Assignee: OnAsset Intelligence, Inc., Irving, TX (US)

( * ) Notice: Subject to any disclaimer, the term of this patent is extended or adjusted under 35 U.S.C. 154(b) by 327 days.

(21) Appl. No.: 11/467,046

(22) Filed: Aug. 24, 2006

(51) Int. Cl.
*G08B 13/14* (2006.01)
(52) U.S. Cl. .............. 340/572.1; 340/568.1; 340/539.1; 340/988
(58) Field of Classification Search ... 340/572.1–572.8, 340/568.1, 539.1, 539.11, 539.13, 531, 988; 342/450, 463, 465
See application file for complete search history.

(56) References Cited

U.S. PATENT DOCUMENTS

| | | | | |
|---|---|---|---|---|
| 6,069,570 A | * | 5/2000 | Herring | 340/825.49 |
| 6,121,926 A | * | 9/2000 | Belcher et al. | 342/450 |
| 7,032,047 B2 | * | 4/2006 | DiRaimondo et al. | 710/200 |
| 7,082,359 B2 | * | 7/2006 | Breed | 701/36 |
| 7,116,230 B2 | * | 10/2006 | Klowak | 340/572.1 |
| 7,173,529 B2 | * | 2/2007 | Przygoda, Jr. | 340/572.4 |
| 7,248,167 B2 | * | 7/2007 | Wassingbo | 340/572.1 |
| 7,271,719 B2 | * | 9/2007 | Ku et al. | 340/539.26 |
| 7,274,909 B2 | * | 9/2007 | Perttila et al. | 455/41.2 |
| 7,417,547 B2 | * | 8/2008 | Kennedy | 340/572.1 |
| 2004/0049428 A1 | * | 3/2004 | Soehnlen et al. | 705/25 |
| 2004/0100380 A1 | * | 5/2004 | Lindsay et al. | 340/540 |
| 2007/0139199 A1 | * | 6/2007 | Hanlon | 340/572.1 |

* cited by examiner

*Primary Examiner*—Daniel Previl
(74) *Attorney, Agent, or Firm*—Bruce C. Lutz

(57) ABSTRACT

A method and apparatus is provided for electronically and wirelessly monitoring a plurality of ID tags of assets as a service for a plurality of tagged asset users and notifying the tagged asset user and/or other authorized entities when conditions sensed by tag circuitry exceeds predetermined boundaries. Typically, the tag will include wireless GPS and/or other sensing circuitry along with telephone type circuitry for communicating sensed data, such as location, to the monitoring service. The notification may further include advertising or other information specifically helpful to the owner of the tagged asset.

13 Claims, 3 Drawing Sheets

FIG. 2

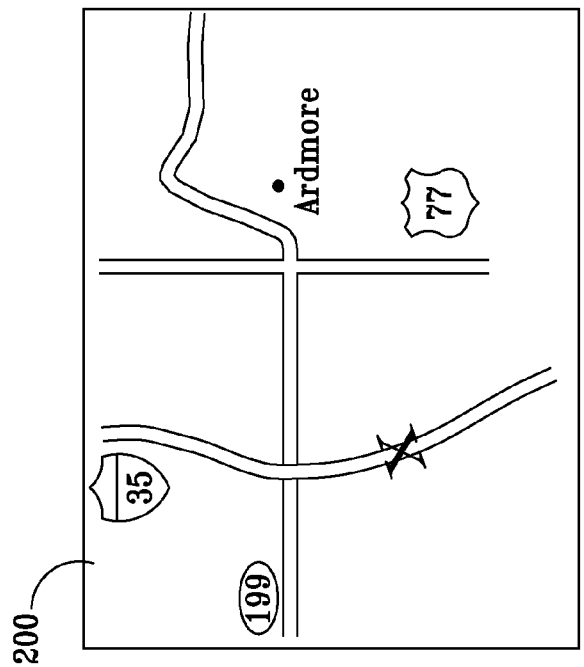

200

ATTENTION

The tag for your boat has been moved from the marina dock on Lake Texoma.
The tag was last detected at Latitude 34.25 Longitude 97.04 as shown by an X on the map.
The tag was moving in a northerly direction when last interrogated at 3:14pm on 23 May 2006.
The closest major town is Ardmore, Oklahoma.
The phone number for the police department in Ardmore, Oklahoma is 580-223-3300.

202

LET JOE'S TOWING AND MOVING SERVICE HAUL YOUR PRIZE POSSESSIONS
CALL 580-555-1407

When in Ardmore, OK the place to eat is at Annie's Cafe at 415 Main Street
Home Cooking at it's BEST.

Best Insurance of Oklahoma City, OK 1-800-457-5874
We handle maritime as well as land based assets.

204

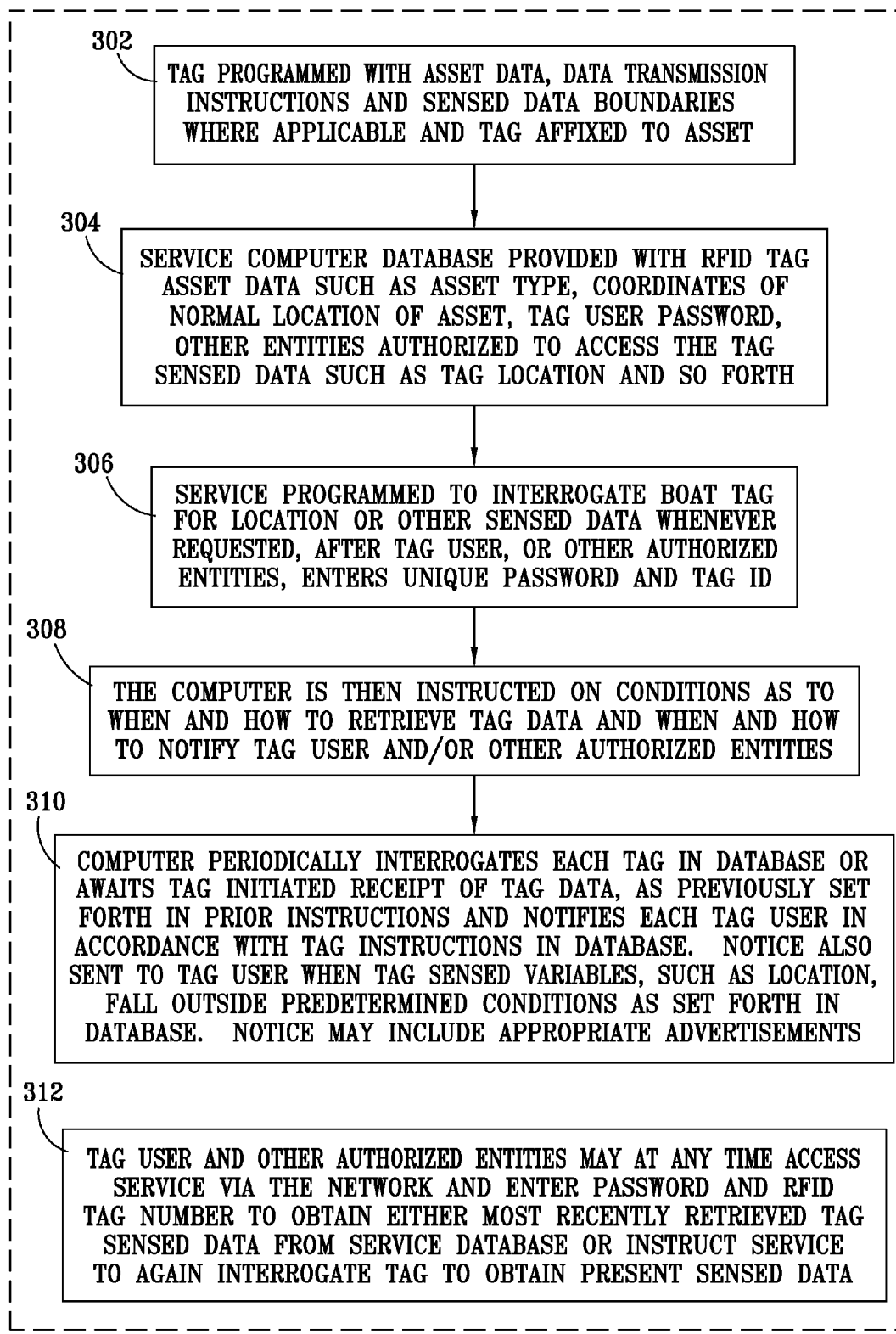

METHOD AND APPARATUS FOR LOCATING AND/OR OTHERWISE MONITORING AN ID TAGGED ASSET'S CONDITION

FIELD OF THE INVENTION

The present invention relates generally to a method of facilitating the user of an ID (Identification) tag, such as an RFID (Radio Frequency Identification), or other authorized party, to access tag data, such as the location of the ID tag.

DESCRIPTION OF THE RELATED ART

There is an abundance of technologies and services that have been developed relating to locating, with more or less exactitude, the whereabouts of an RFID tag or other asset an entity wishes to locate. RTLS (Real Time Location Service) is an acronym presently used in the industry to describe services accomplishing this function. However, there are no technologies or services that have been developed relating to the retrieval of any sensed data of an ID tag other than location. The following patents exemplify the present state of the art and, at least implicitly, its limitations.

A Mar. 14, 2006, U.S. Pat. No. 7,012,520 to Webb describes how RFID tags in combination with a tag reader and GPS and cell phone technology may be used to track the location of the tags when onboard a ship or other means of transport.

A Mar. 5, 1996, U.S. Pat. No. 5,497,149 to Fast relates to a device (not an RFID device), incorporating a GPS receiver and a cell phone that periodically transmits the location of the device to a controller which is programmed to provide an alert when the device is located at other than predetermined locations at given times. In other words, if the device is being transported on a given route between remote start and termination locations and the device is determined to be off track by more than a predetermined amount or is late in arriving at the termination point or designated intermediate points, an alarm will be generated by the controller.

A Jan. 15, 2002, U.S. Pat. No. 6,339,397 to Baker recites a unit to be tracked (not an RFID tag), incorporating a GPS receiver and a cellular telephone transmitter that periodically transmits tracking data via cellular phone to a cellular service provider, thence to a data service bureau which sends the data over the Internet to the database of a central server computer.

A Feb. 21, 2006, U.S. Pat. No. 7,002,473 to Glick et al. relates to a loss prevention system where personal articles are RFID-tagged. A user's monitor (tag reader) periodically interrogates each tag and generates an alarm if the tag does not reply or is out of range of the monitor. An example might be an RFID-tagged wallet which has dropped out of a user's pocket.

U.S. Pat. No. 6,069,570, issued May 30, 2000, to Herring discloses an asset location system that includes a pager, a control processor, a GPS receiver and a cell phone. During normal operation, the electronic equipment (not an RFID tag), on the tracked asset is in a low power or sleep mode. Upon receiving a location query from a call center, a control processor is powered up. The latitude and longitude information of the asset is put in a transmittable form by a cellular phone modem to a monitoring station.

While large organizations use one or more of the above systems to keep track of the location of RFID tag equipment and other assets, the cost is prohibitive for many individuals and smaller organizations that may wish to monitor the location of relatively costly assets. The assets may be perishable and it is desirable to know that the assets are proceeding to a destination in a timely fashion. Assets may have been stolen or otherwise misplaced far from the normal location of that asset and needs to be located so that at least one of the appropriate authorities can attempt to apprehend the thief, an insurance company can minimize its losses, and/or the owner can again use the asset.

It would thus be desirable have a smart ID tag that can periodically check its location and transmit sensed data such as tag location, tag temperature, acceleration information and so forth directly to a predetermined receiver or database without the requirement of an intermediate RFID reader. Alternatively, or in addition, it would be desirable for an ID tag user, or another authorized entity, to be able to economically contact or otherwise access a tag of a specific remote asset and initiate the return to the user of sensed information, such as referenced above, relative that tag.

ID tags typically incorporate data storage means. Thus a tag, in addition to sensed data, may include tagged item data such as "perishable food", "jewelry", "boat" and so forth. Further identifying information for a given item may be included such as, in the instance of the boat, there may be data regarding the owner's name and address, the marina where the boat is normally stored along with that marina's latitude and longitude data and the boat's registration number. With such information, if the boat is stolen or otherwise misplaced, it can be more easily returned to its' appropriate location.

It would further be desirable to have a third party service that can actively monitor the location of a plurality of ID tags for many different users and notify appropriate entities when any of the sensed data of monitored tags differs from a range of predetermined values. An example of such a situation might be when a tagged piece of equipment is to be used only within a given area such as the city limits during normal working hours and is stored in a fixed location in an adjacent city at night. It would also be desirable that the user and other authorized entities be able to access the service-stored data relating to a given tag, and/or alternatively directly access the tag data through the service. It would also be further desirable for the notification, relating to an asset located outside its predetermined boundaries, to include a map having an indication of the tag as determined from the last retrieved location data.

Finally it would be desirable for the ID tag to be a smart RFID tag whereby, when the tagged asset is in the read range of an appropriate tag reader, the tag transmits data to the service through the reader, rather than through a wireless phone service, to save on tag battery resources.

SUMMARY OF THE INVENTION

The present invention comprises a computer system, accessible by a plurality of authorized entities for the purpose of being able to ascertain sensed data, such as the whereabouts of ID tagged assets. The ID tags incorporate wireless communication capability with the computer system as well as location-determining or other sensed data circuitry. The computer system and the ID tags are programmed such that when it is determined that the sensed data values of an asset tag are outside a predetermined set of boundaries, such as location, and this information has been retrieved by the computer system, a notification is transmitted to predetermined authorized entities. These authorized entities may be any of the asset owner, law enforcement authorities, and an asset insuring entity in accordance with instructions preprogrammed into the computer system.

BRIEF DESCRIPTION OF THE DRAWINGS

For a more complete understanding of one or more embodiments of the present invention and the advantages thereof, reference is now made to the following descriptions taken in conjunction with the accompanying drawings, in which:

FIG. 2 exemplifies contents of a notice receivable by an authorized entity of FIG. 1; and FIG. 3 exemplifies, in flow diagram format, steps that may occur in setting up a system database for notifying an authorized entity and/or allowing an authorized entity access to variable and/or static tag data.

DETAILED DESCRIPTION

Figure 1:
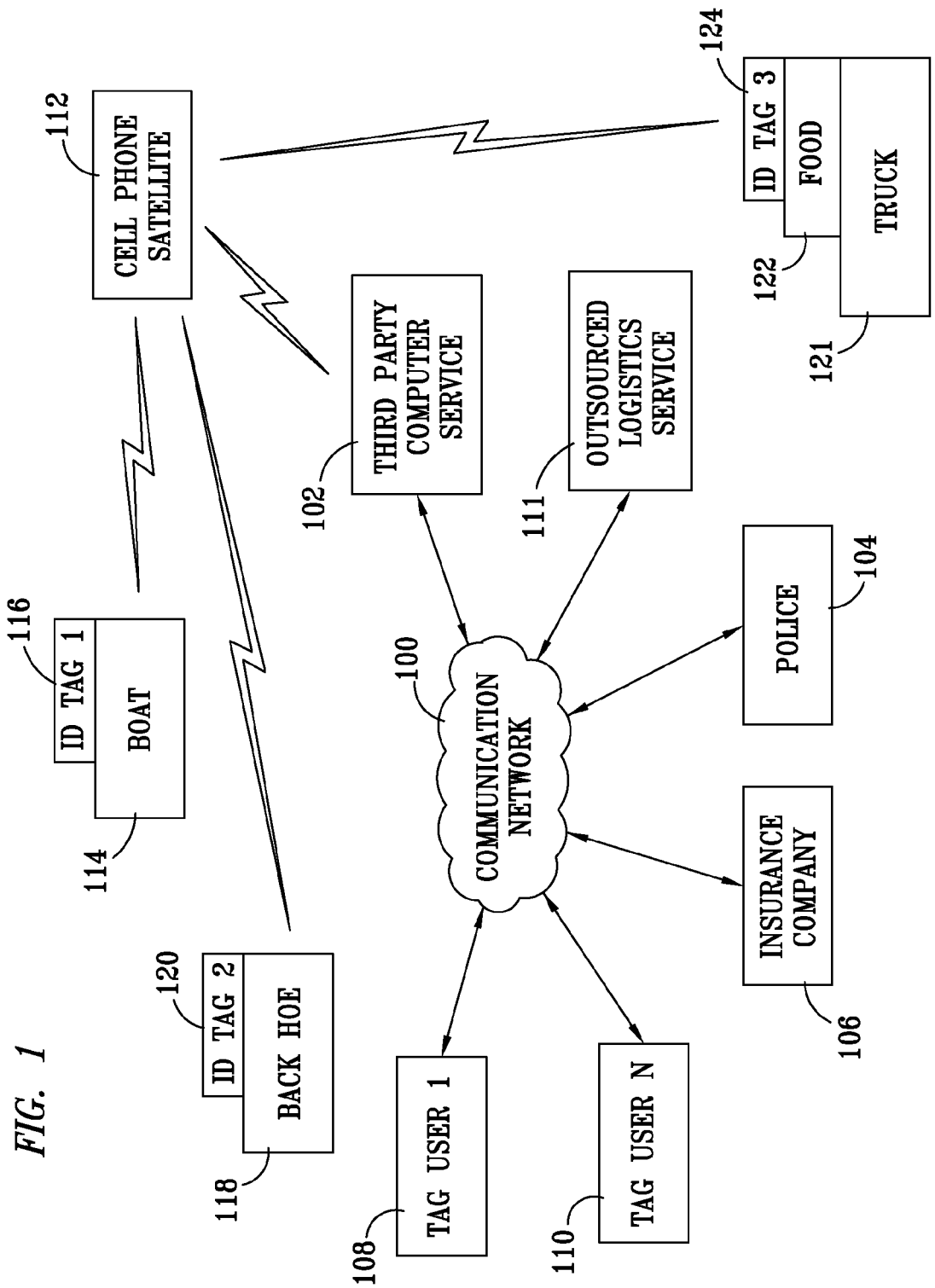
FIG. 1 exemplifies, in block diagram format, major components utilized in communicating RFID tag data to authorized entities, in accordance with one embodiment of the invention.

In FIG. 1 a communication network, such as the Internet, is designated by a reference numeral 100. A third party computer service 102 is shown connected to the network 100 as are at least one police department entity or other law enforcement agency 104 and at least one asset insuring entity 106. A plurality of ID tag users are also connected to the network 100, two of which are exemplified as tag users 1 and N, and are designated as 108 and 110 respectively. Further, an optional outsourced logistics service 111 is shown connected to network 100. A wireless communication service 112 is shown in the figure as a satellite cell phone service coupled to the network 100. While shown as a satellite system, the wireless communication service 112 may comprise ground-based cell phone systems, WiFi networks, and/or the like, which may operate satisfactorily in some applications. A first asset, exemplified as boat 114, is shown with an ID tag 116 attached thereto. The tag 116 is further designated as tag 1. A second asset, exemplified as Backhoe 118, is shown with an ID tag 120 attached thereto. The tag 120 is further designated as tag 2. A truck 121 carrying a food container asset 122 is shown with an ID tag 124 attached thereto. The tag 124 is further designated as tag 3. It is to be understood that a given tag user may use and access the data from a plurality of tagged assets. While not specifically shown as such, each of the blocks 102, 104, 106, 108, 110 and 111 will preferably comprise at least a computer or the like, a display monitor, and a printer, along with data storage means and network access capability for the network 100.

Each of the ID tags 116, 120, and 124 are configured, e.g., as an RFID tag, a cellular communications device (e.g., a cell phone), and/or the like, effective for wirelessly communicating with the computer service 102 via the wireless communications service 112. Preferably, each of the ID tags 116, 120, and 124 will incorporate location sensing circuitry, such as GPS (global positioning system) circuitry, and may well include other sensing circuitry. Thus the tag 124 may include circuitry for sensing the temperature within the food container 122 when the food is perishable. In a similar manner, the tag 116 may well include circuitry for sensing explosive fumes in interior spaces of the boat and/or heat related sensors that may be used to indicate a fire on the boat.

Each of the ID tags 116, 120, and 124 are configured to initiate contact, when so programmed, with the computer service 102 for transmitting data to the computer service 102 for storage therein or to respond to a data access request from the computer service 102. Further, the ID tags 116, 120, and 124 may be programmed to initiate contact with the computer service 102 whenever sensed data values exceed predetermined boundaries such as heat, explosive fume concentration, and location. These boundaries, such as location, can vary with time for assets on the move such as the food container 122 being transported from point A to point B.

Likewise, the tags 116, 120, and 124 may be programmed to only report periodically or to transmit data only in response to a request from the computer service 102. These variables regarding how and when the tags 116, 120, and 124 report affect the battery life for a given tag and must be taken into account when setting up the system and tag battery maintenance. Another programming consideration is the cost of data transmission using computer service 102. When the tag user 1 or N is only interested in notification when tag-sensed data exceeds predetermined boundaries, the tag 116, 120, and 124 typically will be programmed to transmit data only in response to an access request, or when the sensed data indicate that predetermined boundaries are exceeded. Such programming restraints will tend to minimize cost and maximize tag battery life. If an ID tag utilizes both cell phone and RFID technology, and the ID tag is within range of a suitable RFID reader, then the ID tag may power-off the cell phone technology to further conserve battery life.

It should also be noted that the determination, of whether or not sensed data variables exceed predetermined boundaries, may be accomplished in the computational capabilities of the computer service 102 instead of or in addition to taking place in a given tag 116, 120, or 124. As will be apparent to those skilled in the art, it will typically be easier, and cheaper, to modify predetermined notification boundaries for tag data at the computer service 102 rather than at the site of the tag 116, 120, or 124. Thus, if it is determined that the truck 121 is temporarily inoperable but the food in container is not likely to perish because the temperature of the food is being maintained, the notification parameters can be quickly modified at the computer service 102.

As will be apparent, each of the entities 104, 106, 108 and 110 are able to establish communication with computer service 102 and to ID tags 116, 120, and 124 that they are authorized to contact through the use of a computer, fax or other communication medium such as a PDA, cell phone and so forth (not shown).

Thus a tag user, such as 108, when issued a tag must determine how and when data is to be obtained from a given tag, along with how the user, as well as which other authorized entities, are to be notified when sensed data variables are determined to exceed predetermined boundaries.

The third party computer service 102 may advantageously, if it has access to at least some of the tag data, use the data to assist tag users 108 or 110 when they request or otherwise receive tag location information. As an example, when a tag is attached to a boat and the boat is at its normal location, the third party service may, in addition to supplying the requested location data, include brief advertisements to places that sell boat supplies or nautical clothing. Alternatively, if the boat is at a location other than where it is typically located, and/or is presumed to be stolen, included advertisements may refer to theft insurance, boat transporting services or security systems.

FIG. 2 exemplifies a computer monitor presentation of a notification from the computer service 102 to a user such as tag user 108. If at some prior time, the tag user 108 has indicated to the computer service 102 that the police 104 and the insurance company 106 should be notified, these two entities would also be notified with a similar presentation. As may be noted, a map 200 is presented showing the closest major town to the location coordinates provided to the computer service 102 from the location sensing circuitry of tag 116. Since the computer service 102 will typically keep at least a recent history of the global location of the tag 116, it can, in a set of data 202, not only provide the most recent retrieved location coordinates, but also make a determination that the tag has been moving in a northerly direction. An X, indicating tag location, shown on map 200, indicates that the tag (and presumably the boat) was probably being moved on Interstate Highway 35.

Another set of information, designated as 204 in FIG. 2, comprises advertising. This advertising may be useful to the tag user 108 or 110 in retrieving or in otherwise using a tagged asset. The tag user, in some embodiments of the invention, may be allowed to choose whether or not to receive advertisements, but may have to pay a higher fee to the service provider for notifications without advertisements.

As shown in a block 302 in FIG. 3, one of the initial steps in an asset tracking process, of the present invention, is to program or otherwise insert asset data and data transmission instructions and/or conditions into a tag to be affixed to a given asset. Since the asset data is seldom changed, it may be termed static data, as opposed to sensed or variable data. The sensed data boundaries may be placed in either the tag 116, 120, or 124 or the computer service 102, or in both. If the tag 116, 120, or 124 is programmed to determine when the sensed data values exceed predetermined boundaries, it will typically be additionally programmed to initiate contact with the computer service 102 for the purpose of transmitting the data along with the indication as to the sensed data that exceeds the stated value boundaries. The computer service 102 may additionally check the values retrieved from the ID tag 116, 120, or 124 before sending a notice of the type shown in FIG. 2 to the appropriate authorized entities listed in a database of the computer service 102 for the particular ID tag. Alternatively, the tag 116, 120, or 124 may be programmed to store sensed data and transmit same to the computer service 102 only upon request or at predetermined periodic times.

A second initial step in the service process is outlined in a block 304. As indicated, tag asset data is inserted into the database (not shown) of computer service 102 along with the normal use location boundaries of the tagged asset. For the boat 114, it may be a berth at a marina. On the other hand, the tag user 108 or 110 may want to define the shore of the lake where the boat is normally used as the location boundaries. In a similar manner, for the backhoe asset 118, the tag user 108 or 110 may want the boundaries to be a given construction site if it is to be used only on that construction site for an extended period of time. The boundaries for an asset that is being transported from City A to City B (not shown) may have one or more highways functioning as the centerpoint for a set of sensed data location boundaries, outside of which a notification would be sent. Further, the location boundaries may be shifted along the intended highway route over the expected time that it should take to transport the asset from City A to City B.

It is to be realized that, if the ID tag 116, 120, or 124 has sufficient data storage and computing power, the tag data and programming may be inserted and/or modified remotely from the computer service 102.

As outlined in block 306, a further initial step in the setup process is to record, in the computer service 102 database, passwords to be used by the entities authorized to access ID tag data. The last listed step in the set-up process, as set forth in a block 308, comprises instructing the computer service 102, as to when and how to retrieve tag data, and when and how to notify a tag user 108 or 110 and/or other authorized entities 104 or 106. This set of instructions may further include data on whether or not to include advertising, similar to that designated as 204 in FIG. 2, or other tag user potentially helpful information when a notification is sent.

As set forth in a block 310, the computer service 102, then sends notification data to appropriate authorized entities as set forth in internal instructions or upon request by an authorized entity.

As noted in block 312, at anytime, subsequent to initial set-up, the tag user 108 or 110 or any other authorized entities 104 or 106 may access the computer service 102 via the network 100 and enter password and RFID tag number data to obtain either most recently obtained tag sensed data from the service 102 database, or alternatively instruct the service 102 to again interrogate the tag to obtain present sensed data.

From the above it may be appreciated that the computer service 102 database provides a method to program an ID tag 116, 120, or 124 with asset-specific data and reporting conditions. In other words, the reports can be triggered based on a number of factors including fixed reporting schedule, preselected triggers based on geospatial or sensed environmental conditions, as well as direct query requests. It further provides a method to link the tag 116, 120, or 124 with desired services for advertising purposes. Therefore the tagged asset user 108 or 110 can have the option to select certain services or products they would like to be notified of when the tagged asset is in the vicinity of said services or products.

The computer service 102 further provides a method to distribute authorized access to third parties such as insurance companies 106, third-party logistics services 111, and so forth. As part of the data collection and storage process, historical reports may be created such as mapping a tagged asset's route of travel, graphically displaying collected data from any environmental sensors in use, and automatically generating reports based on collected data for transmission to authorized users of the computer service 102 for those tagged assets.

Although the computer service 102 may well be able to provide logistics services to tagged asset user 108 or 110, it may not be interested in doing so or the tag user 108 or 110 may already have a relationship with an outsourced logistics service 111. Thus, an authorized user 108 or 110 of the computer service 102 may well include an outsourced logistics services computer, such as shown as 111 in FIG. 1. As an example, where the tagged assets comprise trucks and/or tagged truck contents, the tag user 108 or 110 may want another service to provide delivery scheduling data, directions and traffic notifications to the drivers of its trucks and would be among the authorized users of certain tagged assets.

As known in the art, the "unique" ID number used for each RFID tag has been a set of numbers utilized by each manufacturer of RFID tags. Presently used standards adopted by known tag manufacturers assure that the first four characters of a tag's ID number are different for each manufacturer. However, if tag address uniqueness does become a problem, the problem may be overcome by having a set of Internet Protocol version 6 (IPv6) addresses assigned for use as the tags "unique" number. This same number (the assigned IPv6 RFID tag number) may also profitably be used for the number or address of the wireless phone circuitry associated with the tag, in some applications of this invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An RTLS (Real Time Location Service) for an entity to maintain cognizance of smart tag initiated data related to the location of an object, the method comprising:
    establishing a tag specific entity in a computer-based database as being authorized to access said database to receive location data of a given smart ID tag associated with said object, said given smart ID tag including GPS (global positioning system) functionality, location boundary outer limit determining functionality and wireless communications circuitry coupled to said GPS functionality for ascertaining the location of said given smart ID tag and communicating location data to said database when it is determined by said given smart ID tag that the location boundary outer limits have been exceeded said database including location boundary data defining the outer limits of a specified area within which said object is to remain at specified times;
    receiving smart tag location data transmitted from at least one smart ID tag, the location information being periodically determined by circuitry of said smart tag and the transmission thereof being initiated by said smart tag as a function of internal logic of said smart tag;
    storing in a database said location data received from said at least one smart ID tag;
    receiving a request that location data received from said given smart ID tag of said object be communicated to said tag specific entity; and
    transmitting said location data to said tag specific entity.

2. The method of claim 1, wherein said computer-based database is a third party computer-based database; and the method further comprises transmitting said location data of said given smart ID tag of said object to said tag specific entity whenever it is determined that said location boundary is exceeded.

3. A computer system comprising:
    data storage means operable to store static data, variable database information pertaining to said static data, and sensed data of a plurality of smart ID tags utilized by a plurality of respective tag user entities;
    means for storing in said computer system a list of authorized entities permitted to access data received from each of a plurality of smart ID tags;
    wireless reception means operable to receive location data from said smart ID tags, wherein said smart ID tags include GPS functionality effective for generating location data, location boundary outer limit determining functionality and wireless data communication circuitry effective for initiating the communication of said location to said wireless reception means when said smart ID tag determines that the location boundary outer limits have been exceeded; and
    network access means operable to communicate with entities, including at least one of tag users and entities authorized by specified tag users, sensed data received from said smart ID tags, said computer system being operable to provide a notification to predetermined entities when received smart ID tag data values exceed predetermined boundaries.

4. An object monitoring service as claimed in claim 3 and additionally comprising:
    at least one object to be monitored;
    data storage apparatus for receiving data related to remote objects being monitored; and
    a smart ID tag, attached to said at least one object to be monitored, said smart ID tag being programmed to initiate transmission of data to said data storage apparatus upon a determination by said smart tag that a given monitored parameter exceeds predetermined limits.

5. Apparatus as claimed in claim 4 comprising in addition:
    notification transmission means associated with said data storage means and operable to notify clients when monitored parameters exceed predetermined limits, said notification including at least one third party advertisement for at least one of service and product relating to at least one of the remote objects being monitored and the monitored parameters of said object whose predetermined limits have been exceeded.

6. A method of reducing the misappropriation of property, the method comprising:
    receiving from a smart ID tag associated with an asset asset-related data sensed by said smart ID tag and transmitted as a function of smart tag internal logic for detected data exceeding programmed defined limits, the transmission of said data being initiated by said smart ID tag upon a determination by said tag that defined limits have been exceeded;
    receiving, from a smart ID tag associated with an asset asset-related data sensed by said smart ID tag, said asset-related data including at least global location data generated within said smart ID tag, said smart ID tag incorporating a GPS (global positioning system) for generating said global location data, location boundary outer limit determining functionality and wireless communication capability for initiating the communication of said global location data from said smart tag when it is determined by said smart ID tag that the location boundary outer limits have been exceeded; and
    generating a notification and notifying at least one of one or more tag-authorized entities and law enforcement authorities when location boundary outer limits have been exceeded.

7. The method of claim 6 wherein said notification includes an advertisement relating to at least one of said asset and any sensed data.

8. A method of generating a notification upon the likelihood that insured property may be lost, misappropriated, or damaged for risk mitigation comprising:
    attaching a smart ID tag to insured property, said smart ID tag incorporating GPS (global positioning system) and further including at least one sensor for sensing at least one value of said insured property and for generating sensed data indicative of said at least one value and communication circuitry for initiating the communication of said sensed data to a remote computer system when said smart ID tag logically determines that internally stored limits for values of said sensed data have been exceeded;
    programming said smart ID tag with asset-specific data and trigger conditions for initiating the communication of sensed data said remote computer system;
    saving received data within said computer system operable to communicate with said smart ID tag, said data including said trigger conditions and entities authorized to be notified when said sensed data is determined to be outside predetermined boundaries;

maintaining a historical record of sensed data communicated from said smart ID tag to said computer system; and generating a notification to at least one of tag specific authorized entities and law enforcement authorities with information indicative of the values of at least the most recently communicated sensed data determined to be outside predetermined boundaries.

9. The method of claim 8 wherein said entities authorized to be notified includes at least an asset insuring entity.

10. The method of claim 8 wherein said smart ID tag is attached to said asset in a substantially tamperproof manner.

11. The method of claim 8 wherein said notification includes a map indicating where said smart ID tag is located based upon the most recently communicated location data.

12. A smart wireless ID tag comprising:

location determining circuitry operable to provide output signals indicative of location with respect to earth;

storage means operable to retain data defining geo-fence boundary limits and smart tag specific entities to be notified upon detection by said tag that said geo-fence boundary limits have been exceeded;

logic means, interconnected to said storage means and said location determining circuitry, said logic means being operable to determine when the location of said ID tag is beyond the geo-fence boundary limits defined in said storage means; and signal transmission circuitry operable to initiate transmission of data to a notify said entities upon a determination by said ID tag that the location of the tag is beyond the predefined geo-fence boundary limits.

13. A computer system comprising:

wireless reception means operable to receive data from smart ID tags data storage means operable to store static data, variable database information pertaining to said static data, and sensed data of a plurality of smart ID tags utilized by a plurality of respective tag user entities;

means for storing in said computer system a list of tag specific authorized entities permitted to access data received from each of a plurality of smart ID tags;

smart ID tags having GPS functionality effective for generating location data, location boundary outer limit determining functionality and wireless data communication circuitry effective for communicating said location to said wireless reception means when it is determined by said smart ID tag that the location boundary outer limits have been exceeded; and network access means operable to communicate with entities, including at least one of tag users and entities authorized by specified tag users, sensed data received from said smart ID tags.

\* \* \* \* \*